(12) United States Patent
Bae et al.

(10) Patent No.: US 10,680,275 B2
(45) Date of Patent: Jun. 9, 2020

(54) DEVICE FOR CHARGING AND DISCHARGING AND METHOD FOR CHARGING AND DISCHARGING BATTERY CELL USING THE SAME

(71) Applicant: LG CHEM, LTD., Seoul (KR)

(72) Inventors: Sung Hoon Bae, Daejeon (KR); Seok Je Kim, Daejeon (KR); Dae Sik Chung, Daejeon (KR); Su Han Park, Daejeon (KR); Dae Geun Gu, Daejeon (KR); Seung Cheol Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/674,825

(22) Filed: Nov. 5, 2019

(65) Prior Publication Data

US 2020/0153030 A1    May 14, 2020

(30) Foreign Application Priority Data

Nov. 9, 2018  (KR) .......................... 10-2018-0137089

(51) Int. Cl.
| | | |
|---|---|---|
| H01R 4/28 | (2006.01) | |
| H01R 13/24 | (2006.01) | |
| H01M 10/04 | (2006.01) | |
| H01M 10/42 | (2006.01) | |
| H01M 10/44 | (2006.01) | |

(52) U.S. Cl.
CPC ... H01M 10/0481 (2013.01); H01M 10/4285 (2013.01); H01M 10/446 (2013.01)

(58) Field of Classification Search
CPC combination set(s) only.
See application file for complete search history.

(56) References Cited

U.S. PATENT DOCUMENTS

| | | | |
|---|---|---|---|
| 2012/0071040 A1* | 3/2012 | Park | H01M 10/44 439/889 |
| 2016/0336613 A1* | 11/2016 | Mochizuki | H01M 10/052 |
| 2018/0047950 A1 | 2/2018 | Lim et al. | |

FOREIGN PATENT DOCUMENTS

| | | | | |
|---|---|---|---|---|
| JP | 2014-165068 A | 9/2014 | | |
| KR | 10-2010-0021704 A | 2/2010 | | |
| KR | 10-2012-0116753 A | 10/2012 | | |
| KR | 10-1211212 B1 | 12/2012 | | |
| KR | 10-2016-0004661 A | 1/2016 | | |
| KR | 20160022793 A * | 3/2016 | | H01M 10/44 |
| KR | 20160067491 A * | 6/2016 | | H02J 7/00 |
| KR | 10-2016-0118931 A | 10/2016 | | |
| KR | 10-1728102 B1 | 4/2017 | | |
| KR | 10-1790639 B1 | 10/2017 | | |

* cited by examiner

*Primary Examiner* — Kaity V Chandler
(74) *Attorney, Agent, or Firm* — Birch, Stewart, Kolasch & Birch, LLP

(57) ABSTRACT

A charge/discharge pressurizing device includes a first pressurizing jig configured to pressurize one surface of an electrode lead of a battery cell, a second pressurizing jig configured to pressurize an other surface of the electrode lead facing the one surface of the electrode lead, a guide configured to be disposed to be spaced apart from the one surface of the first pressurizing jig by a predetermined distance, and a first pressurizing jig controller configured to be connected to the first pressurizing jig and to move the first pressurizing jig toward the one surface of the electrode lead.

15 Claims, 7 Drawing Sheets

【Fig. 1】
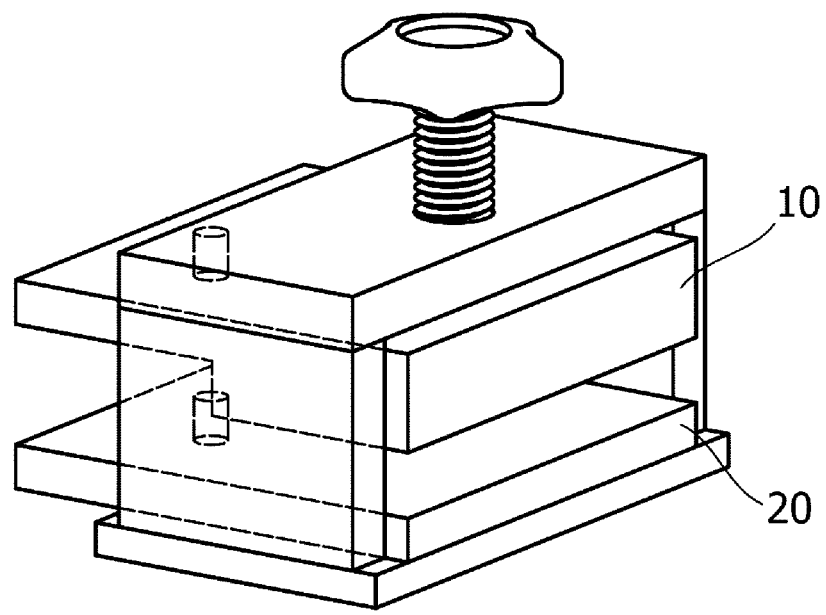

【Fig. 2】
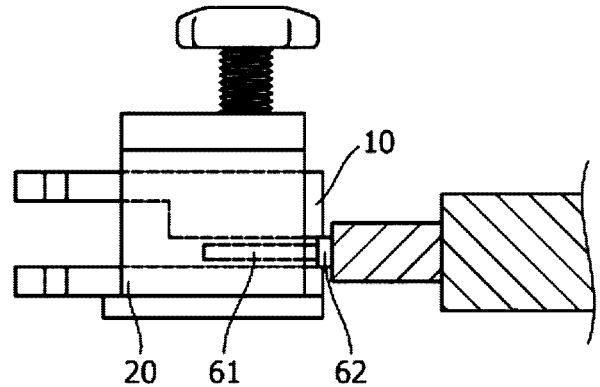
【Fig. 3】
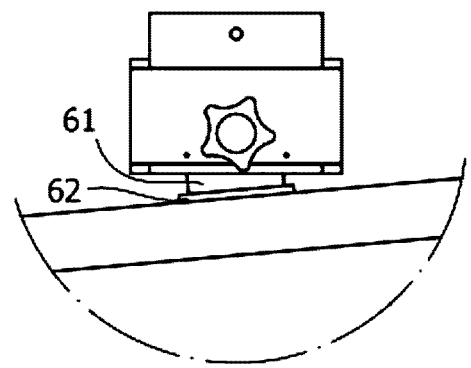
【Fig. 4】
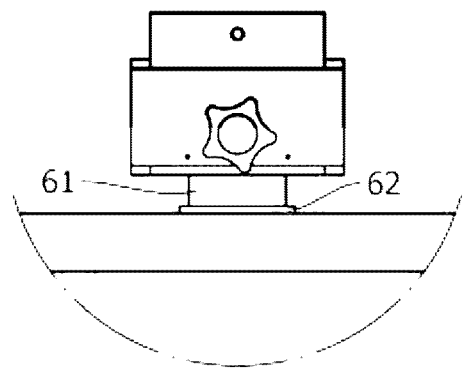

[Fig. 5]
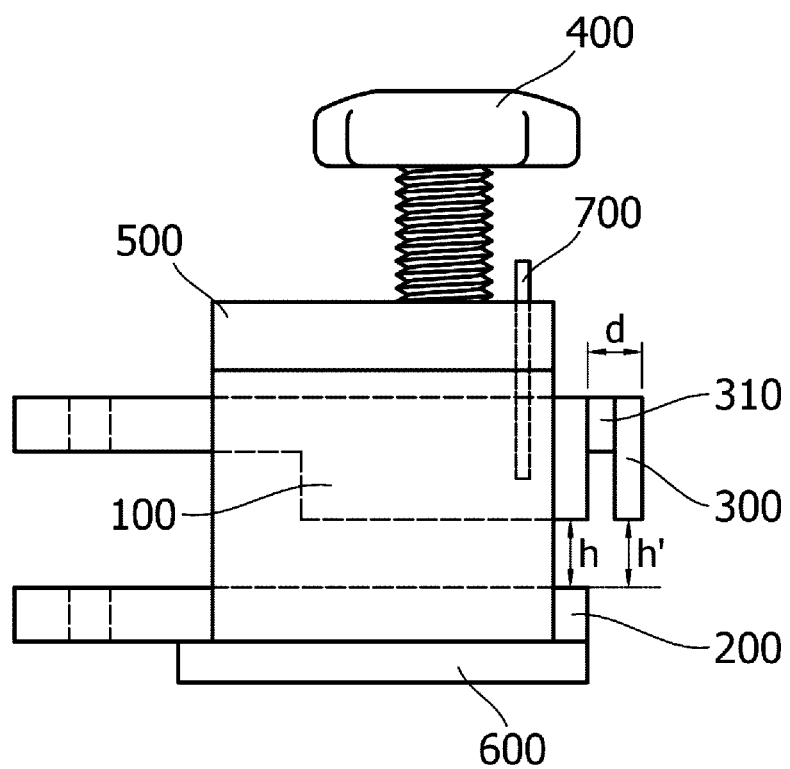

[Fig. 6]
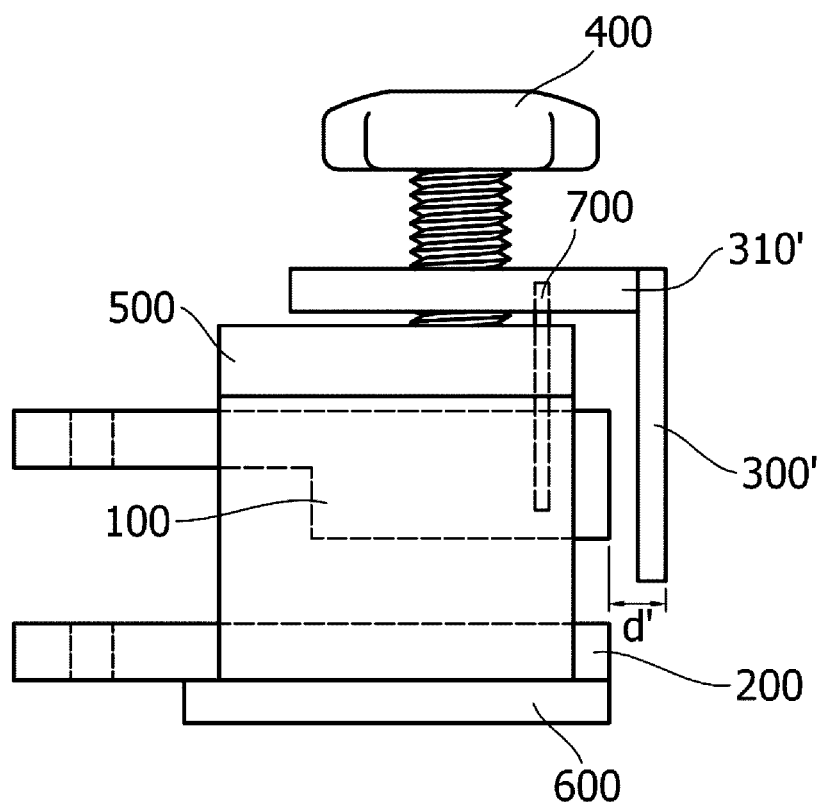

[Fig. 7]
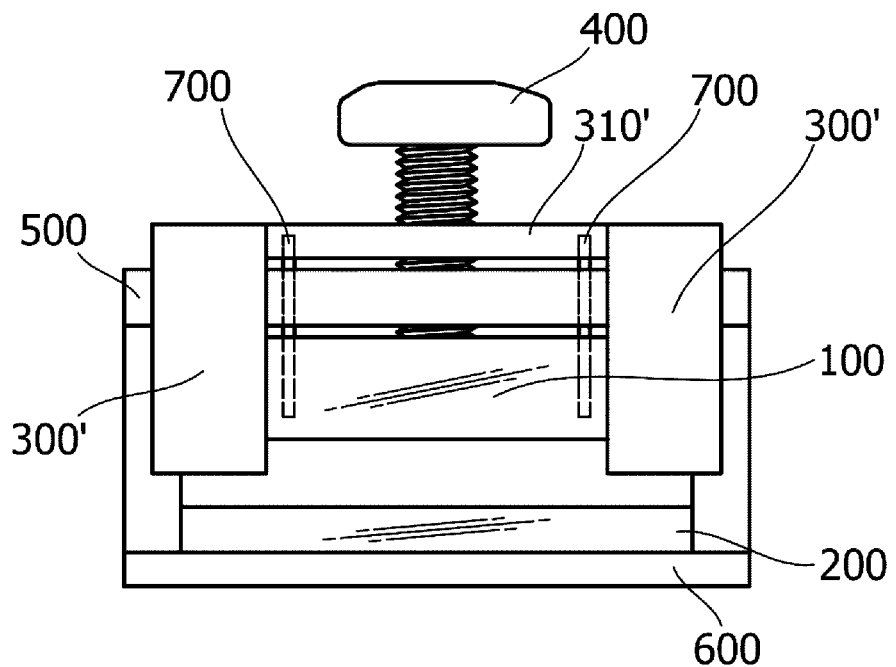
[Fig. 8]
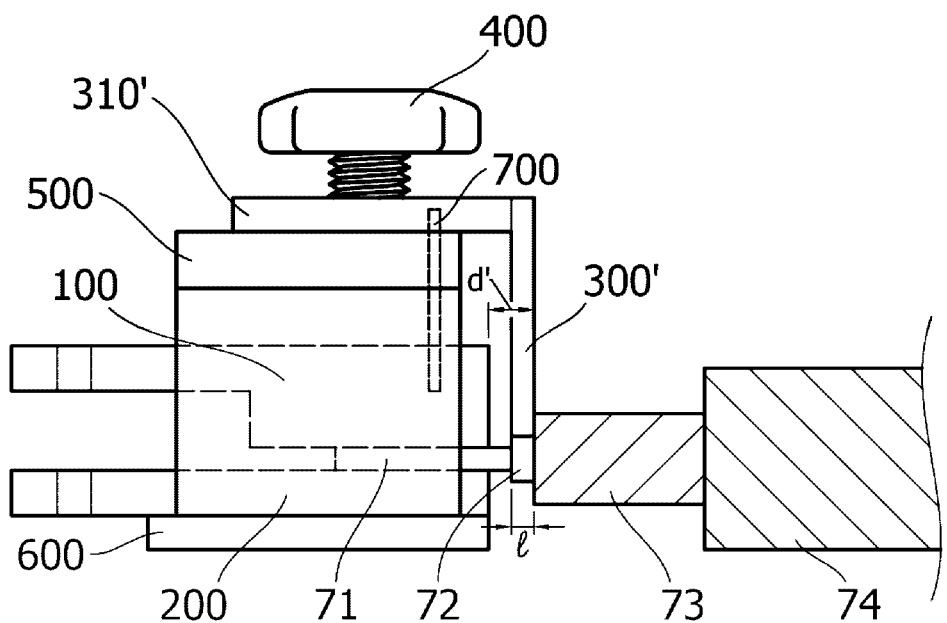

[Fig. 9]
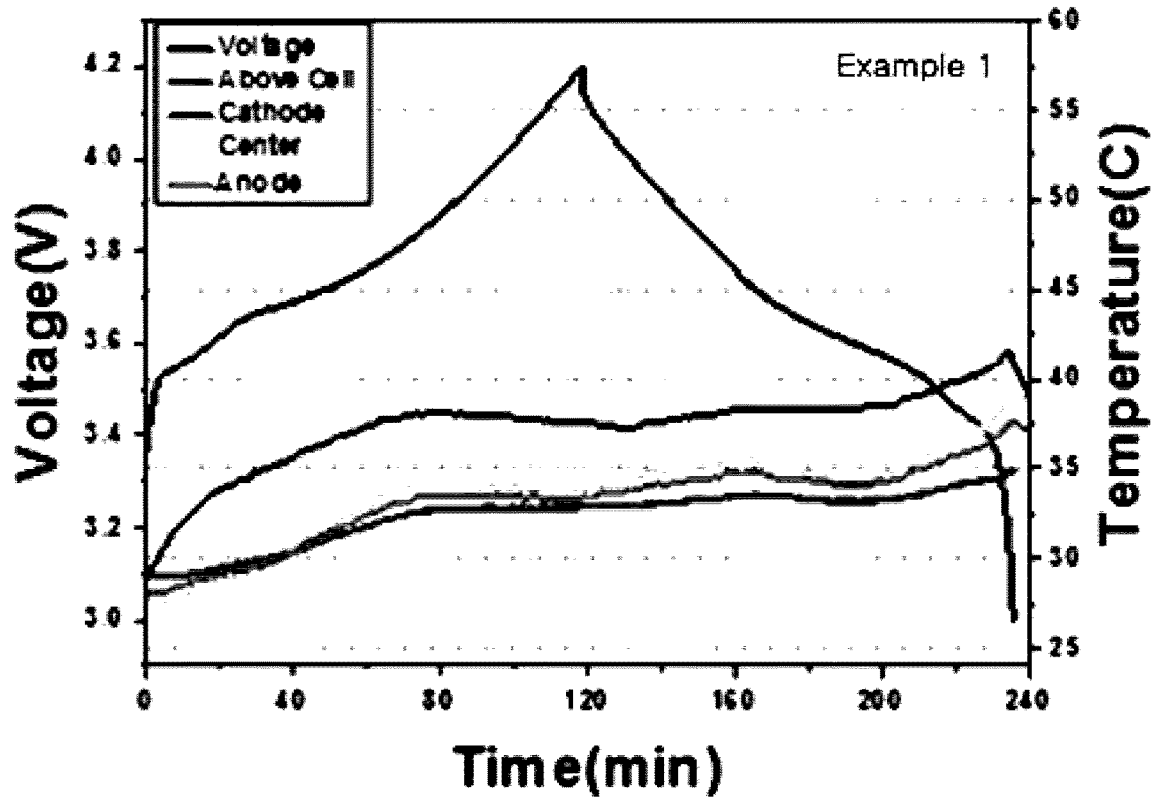
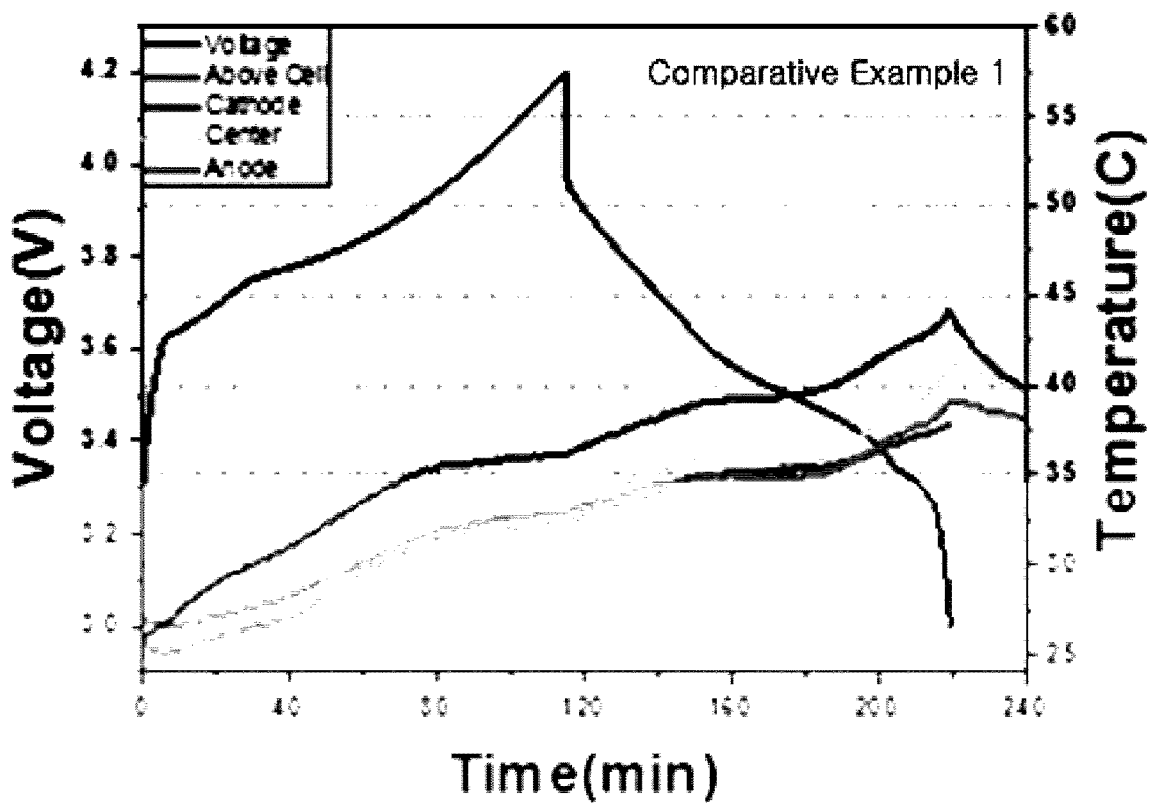

[Fig. 10]
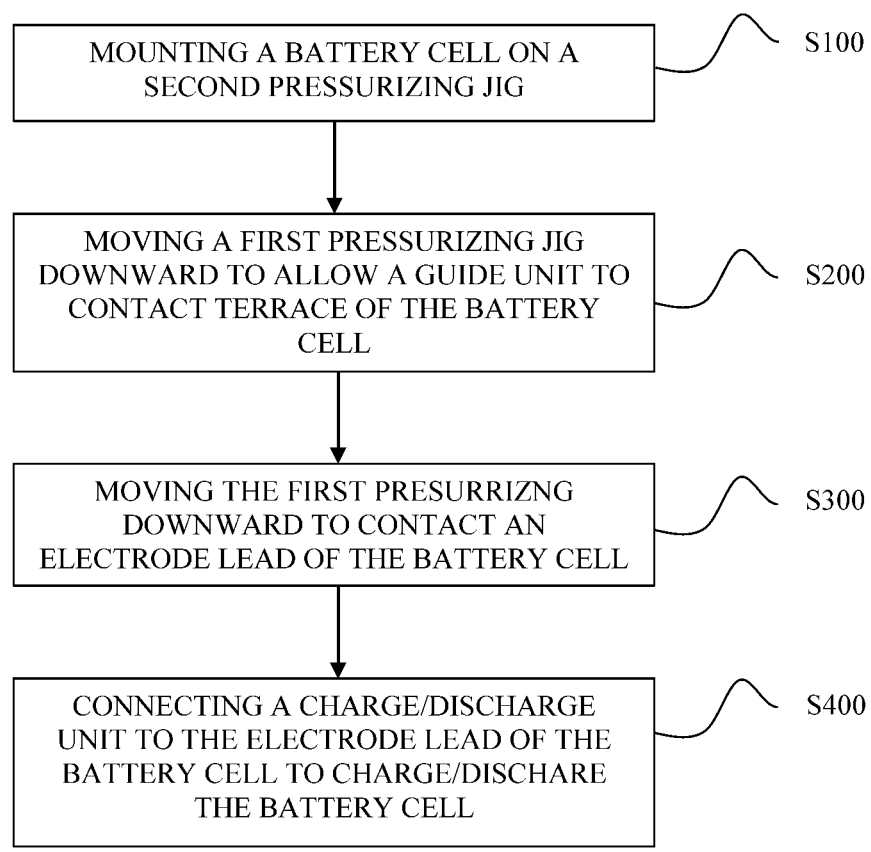

DEVICE FOR CHARGING AND DISCHARGING AND METHOD FOR CHARGING AND DISCHARGING BATTERY CELL USING THE SAME

CROSS REFERENCE TO RELATED APPLICATION

This non-provisional application claims the benefit under 35 U.S.C. § 119(a) to Patent Application No. 10-2018-0137089, filed in the Republic of Korea on Nov. 9, 2018, which is hereby expressly incorporated by reference into the present application.

TECHNICAL FIELD

The present invention relates to a charge/discharge pressurizing device and a method of charging/discharging a battery cell by using the same.

BACKGROUND ART

In recent years, as the price of energy sources increases due to the depletion of fossil fuels and the interest of environmental pollution is amplified, the demand for environmentally friendly alternative energy sources has become an indispensable factor for future life. As such, various researches on power generation technologies such as nuclear power, solar power, wind power, and tidal power have been continued, and electric power storage devices for more efficient use of such generated energy have also been attracting much attention.

In particular, with the development of technology and demand for mobile devices, the demand for batteries as energy sources is rapidly increasing, and accordingly, a lot of researches on batteries capable of meeting various demands have been conducted.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having advantages such as high energy density, discharge voltage, and output stability.

In general, such a secondary battery is formed in a structure such that an electrode assembly including a positive electrode, a negative electrode, and a separator disposed therebetween is built in a battery case, and positive and negative electrode tabs are welded to two electrode leads and are sealed to be exposed to the outside of the battery case. The electrode lead is electrically connected to the external device through contact with the external device, and the secondary battery supplies power to the external device through the electrode lead or receives power from the external device.

Meanwhile, the secondary battery is manufactured by accommodating an electrode assembly in a battery case and injecting electrolyte, followed by a battery activation step. At this time, the battery activation step includes the process of charging and discharging the secondary battery in the conditions necessary for activation after mounting the secondary battery in a device for charging and discharging a secondary battery. Such a secondary battery charging and discharging device is mainly used to charge or discharge the secondary battery in the battery activation step, as well as used for performance evaluation purposes of the secondary battery.

However, in order to properly charge or discharge the secondary battery using the secondary battery charging and discharging device, the secondary battery should be properly mounted on the secondary battery charging and discharging device. That is, the electrode lead of the secondary battery is disposed to contact the conductive portion of the secondary battery charging and discharging device so that both are electrically connected, and the electrical connection state should be maintained while charging and discharging is in progress.

The secondary battery charging and discharging device for this purpose is generally provided with a fixing jig for fixing the electrode lead. During charging and discharging of the secondary battery, when the fixing jigs 10 and 20 of the conventional electrode leads are applied as shown in FIG. 1, the fastening method of the battery cell becomes not the same, and thus the resistance is changed depending on the fastening method.

Specifically, as shown in FIGS. 2 to 4, when the electrode lead film 62 is in contact with the jigs 10 and 20, a large contact resistance is generated, and a difference in contact resistance occurs depending on the length of the electrode lead 61 due to the electrode lead 61 being fastened in a deviated manner or the electrode lead 61 being excessively inserted or not sufficiently inserted into the jigs 10 and 20. As a result, in spite of fastening the same battery cell to the jig, a problem arises in that the experimental results vary depending on how the battery cell is fastened.

Thus, in order to accurately perform an experiment, it is necessary to develop a charge/discharge device capable of fastening the battery cells equally in every experiment.

DISCLOSURE

Technical Problem

In order to solve the problems of the prior art as described above, an object of the present invention is to provide a charging and discharging pressurizing device capable of horizontally fastening the battery cell without allowing the electrode lead to be deviated and capable of fastening the battery cell equally in every experiment by being equipped with a guide to be in contact with the terrace of the battery cell, and a charging and discharging method using the device.

Technical Solution

A charge/discharge pressurizing device according to an embodiment of the present invention may include a first pressurizing jig configured to pressurize one surface of an electrode lead of a battery cell, a second pressurizing jig configured to pressurize an other surface of the electrode lead facing the one surface of the electrode lead, a guide configured to be disposed to be spaced apart from one surface of the first pressurizing jig by a predetermined distance, and a first pressurizing jig controller configured to be connected to the first pressurizing jig and to move the first pressurizing jig toward the one surface of the electrode lead.

The guide may be configured to contact a terrace of the battery cell when the first pressurizing jig pressurizes the one surface of the electrode lead in a state that the battery cell has been mounted on an upper surface of the second pressurizing jig.

The guide may include a first guide and a second guide disposed at opposite sides of the one surface of the first pressurizing jig.

A distance between the first pressurizing jig and the guide may be equal to or greater than a length of a lead film of the battery cell.

The charge/discharge pressurizing device may further include a guide support which supports the guide such that the guide is spaced apart from the one surface of the first pressurizing jig by the predetermined distance.

One side of the guide support may be connected to the first pressurizing jig, and an other side of the guide support may be connected to the guide.

A height of each of the first pressurizing jig and the guide from an upper surface of the second pressurizing jig may correspond to each other, or the height of the guide may be greater than or equal to the height of the first pressurizing jig.

A height difference between the height of the first pressurizing jig and the height of the guide may be smaller than a thickness of a terrace of the battery cell.

On the other hand, one side of the guide support may be connected to the first pressurizing jig controller, and an other side of the guide support may be connected to the guide unit. Further, the guide support may be movable toward the one surface of the electrode lead by the first pressurizing jig controller.

Herein, the guide may move by a same height of the first pressurizing jig from an upper surface of the second pressurizing jig when the first pressurizing jig pressurizes the one surface of the electrode lead in a state that the battery cell has been mounted on the upper surface of the second pressurizing jig.

Further, the guide may further include a first guide, a second guide, and a width adjuster configured to adjust a width between the first and second guides.

Meanwhile, the charge/discharge pressurizing device may further include a base frame configured to fix the first pressurizing jig controller to face the one surface of the electrode lead, and a support frame configured to support the second pressurizing jig to face the other surface of the electrode lead.

The charge/discharge pressurizing device may further include a charger/discharger configured to be electrically connectable to the electrode lead of the battery cell.

The charge/discharge pressurizing device may further include parallel holding pins disposed at opposite sides of the one side surface of the first pressurizing jig.

Further, a method of charging/discharging a battery cell according to an embodiment of the present invention is a method of charging/discharging a battery cell by using the charge/discharge pressurizing device described above and includes steps of mounting the battery cell on an upper surface of the second pressurizing jig, moving the first pressurizing jig downward to allow the guide to contact a terrace of the battery cell to thereby horizontally adjust the mounted battery cell, further moving the first pressurizing jig to contact one surface of an electrode lead of the battery cell to thereby pressurize the one surface of the electrode lead, and connecting a charger/discharger to the electrode lead in a state that the one surface of the electrode lead has been pressurized to thereby charge/discharge the battery cell.

Advantageous Effects

The charging and discharging pressurizing device according to the present invention includes a guide in contact with the terrace of a battery cell, whereby the battery cell can be horizontally fastened so as to prevent the electrode lead from being deviated. In addition, it is possible to prevent a fastening failure such as electrode leads being excessively inserted or insufficiently inserted, and it is possible to fasten and fix the battery cells in the same manner in every experiment.

In addition, during the charging and discharging process of the battery cell using the charging and discharging device, the electrode lead of the battery cell can be firmly fixed, so that while charging and discharging is in progress, the electrode lead may be maintained in contact with the conductive portion of the charging and discharging device, and thus an accurate experiment may be performed.

BRIEF DESCRIPTION OF THE DRAWINGS

FIG. 1 is a perspective view showing a device including a conventional charging and discharging pressurizing device.

FIGS. 2 to 4 are views showing a state in which the electrode lead of a battery cell is pressurized in a conventional device, respectively.

FIG. 5 is a perspective view showing a charging and discharging pressurizing device according to an embodiment of the present invention.

FIGS. 6 and 7 are a side view and a front view showing a charge/discharge pressurizing device according to another embodiment of the present invention, respectively.

FIG. 8 is a side view illustrating a state in which an electrode lead of a battery cell has been pressurized by a charge/discharge pressurizing device according to another embodiment of the present invention.

FIG. 9 is a graph showing a temperature and a voltage measured in Example 1 and Comparative Example 1, respectively.

FIG. 10 is a flow chart showing a method of charging/discharging a battery cell according to an embodiment of the present invention.

DETAILED DESCRIPTION OF THE PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In describing the drawings, similar reference numerals are used for similar elements. In the accompanying drawings, the dimensions of the structures are shown in an enlarged scale for clarity of the invention. Terms such as "first" and "second" may be used to describe various components, but the components should not be limited by the terms. The terms are used only for the purpose of distinguishing one component from another. For example, without departing from the scope of the present invention, a first component may be referred to as a second component, and similarly, the second component may also be referred to as the first component. Singular expressions include plural expressions unless the context clearly indicates otherwise.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween.

Hereinafter, an assembled pressurizing jig according to an embodiment of the present invention will be described with reference to the drawings.

FIG. 5 is a perspective view showing a charging and discharging pressurizing device according to an embodiment of the present invention, FIGS. 6 and 7 are a side view and a front view showing a charge/discharge pressurizing device according to another embodiment of the present invention, respectively, and FIG. 8 is a side view illustrating a state in which an electrode lead of a battery cell has been pressurized by a charge/discharge pressurizing device according to another embodiment of the present invention.

A charge/discharge pressurizing device according to an embodiment may include a first pressurizing jig 100, a second pressurizing jig 200, guide units 300 and 300', and a first pressurizing jig control unit 400.

The first pressurizing jig 100 may pressurize one surface of the electrode lead 71 of the battery cell, and the second pressurizing jig 200 may pressurize the other surface facing one surface of the electrode lead 71. Specifically, the first pressurizing jig 100 may move upward and downward based on one surface of the electrode lead 71 of the battery cell under the control of the first pressurizing jig control unit 400. In this case, the first pressurizing jig 100 moves downward to fix the electrode lead 71 together with the second pressurizing jig 200. That is, the first pressurizing jig may fix the electrode lead 71 together with the second pressurizing jig 200 by moving the first pressurizing jig 100 downward by the first pressurizing jig control unit 400 in a state that the electrode lead 71 is interposed between the first pressurizing jig 100 and the second pressurizing jig 200. In addition, the first pressurizing jig 100 may release the electrode lead 71 by moving upward by the first pressurizing jig control unit 400.

The first pressurizing jig 100 and the second pressurizing jig 200 may each have a flat plate shape in a rectangular structure on each plane. In addition, each of the first pressurizing jig 100 and the second pressurizing jig 200 may be made of a conductive material, and thus may be electrically connected to the electrode lead 71 by contacting the electrode lead 71. In this case, the electrode lead 71 is provided in the battery cell and may be a positive electrode lead and/or a negative electrode lead.

The first pressing jig control unit 400 may be connected to the first pressurizing jig 100 to thereby move the first pressurizing jig 100 toward one surface of the electrode lead 71. The first pressurizing jig control unit 400 may perform a reciprocating movement in a direction opposite to one surface of the electrode lead 71 in order to separate the battery cell from the charge/discharge pressurizing device after performing charge/discharge in a state that the electrode lead 71 of the battery cell has been pressurized.

As illustrated in FIGS. 5 to 8, for example, the first pressurizing jig control unit 400 performs a rotational movement by being connected to the first pressurizing jig 100 and may be implemented in a form that includes a rotation shaft having a screw thread provided on the outer circumference while being connected to the first pressurizing jig 100 while penetrating a base frame 500 to be described later. In addition, although not shown in the drawings, a bearing structure may be applied to the connection portion between the rotation shaft and the first pressurizing jig 100 so that the first pressurizing jig 100 does not rotate but only performs vertical movements even at the time of the rotational movement of the rotation shaft.

Meanwhile, during charging and discharging of the secondary battery cell, when the fixing jigs 10 and 20 of the conventional electrode leads are applied as shown in FIG. 1, the fastening method of the battery cell becomes not the same, and thus the resistance is changed depending on the fastening method. Specifically, as shown in FIGS. 2 to 4, when the electrode lead film 62 is in contact with the jigs 10 and 20, a large contact resistance is generated, and a difference in contact resistance occurs depending on the length of the electrode lead 61 due to the electrode lead 61 being fastened in a deviated manner or the electrode lead 61 being excessively inserted or not sufficiently inserted into the jigs 10 and 20. As a result, in spite of fastening the same battery cell to the jig, a problem arises in that the experimental results vary depending on how the battery cell is fastened.

On the other hand, the charge/discharge pressurizing device according to the present invention may include a guide units 300 and 300' to thereby allow the battery cell to be horizontally fastened in a manner that the electrode lead 71 is not dislocated.

The guide units 300 and 300' may be disposed to be spaced apart from one side of the first pressurizing jig 100 by a predetermined distance. Here, the distances d and d' between the first pressurizing jig 100 and the guide units 300 and 300' may correspond to the length of the lead film 72 of the battery cell (the length l in the direction of the terrace 73 from the electrode lead 71). As the distances d and d' correspond to the length of the lead film 72, when the first pressurizing jig 100 pressurizes one surface of the electrode lead 71 in a state that a battery cell has been mounted on the upper surface of the second pressurizing jig 200, the guide units 300 and 300' may contact the terrace 73 of the battery cell. Alternatively, the distances d and d' between the first pressurizing jig 100 and the guide units 300 and 300' may be greater than or equal to the length of the lead film 72 of the battery cell, but they are preferably 101 to 110% of the length of the lead film 72. If the distances d and d' exceed the above range, a fastening failure may occur such that the electrode lead 71 is not sufficiently inserted. On the contrary, when the distances d and d' are less than the length of the lead film 72, a fastening failure, in which the electrode lead 71 is excessively inserted, may occur.

As a result, when the first pressurizing jig 100 pressurizes one surface of the electrode lead 71 in a state where the battery cell is mounted on the upper surface of the second pressurizing jig 200, the guide units 300 and 300' may contact the terrace 73. Thus, a fastening failure such as excessive insertion or insufficient insertion of the electrode lead 71 of the battery cell mounted on the upper surface of the second pressurizing jig 200 can be prevented, the battery cells can be fastened horizontally so that the electrode lead 71 is not dislocated, and the battery cells can be fastened in the same manner at each experiment.

In addition, the guide units 300 and 300' are preferably disposed at both sides with respect to one side of the first pressurizing jig 100, and the guide units 300 and 300' disposed at both sides may a first guide and a second guide, respectively. In this case, the guide units 300 and 300' may not overlap the lead film 72 of the mounted battery cell. If the guide units 300 and 300' pressurize the lead film 72 of the battery cell, a damage such as the bending of the electrode lead 71 disposed below the lead film 72 may occur. As such, it is preferable that the guide units 300 and 300' are disposed on both sides of the lead film 72 so as not to pressurize the lead film 72 of the mounted battery cell. In addition, the guide units 300 and 300' may further include a width adjusting unit (not shown) capable of adjusting the width, and the width of the guide units 300 and 300' may be adjusted by the width adjusting unit (not shown) so as not to overlap the lead film 72 according to the width of the lead film 72 of the mounted battery cell.

Meanwhile, the charge/discharge pressurizing device may further include guide support units 310 and 310' for supporting the guide units 300 and 300' to be spaced apart from one side of the first pressurizing jig 100 by a predetermined space.

Here, as shown in FIG. 5, one side of the guide support unit 310 may be connected to the first pressurizing jig 100, and the other side of the guide support unit 310 may be connected to the guide unit 300, so that the guide unit 300 may be supported to be spaced apart from one side surface of the first pressurizing jig 100 by a predetermined space. In this case, as one side of the guide support unit 310 is connected to the first pressurizing jig 100, the guide support unit 310 may firmly support the guide unit 300 in a fixed structure.

At this time, the heights h and h' of the first pressurizing jig 100 and the guide unit 300 from the upper surface of the second pressurizing jig 200 may correspond to each other. Alternatively, the height h' of the guide unit 300 from the upper surface of the second pressurizing jig 200 may be equal to or greater than the height h of the first pressurizing jig 100. Further, the height difference between the first pressurizing jig 100 and the guide unit 300 is preferably smaller than the thickness of the terrace 73 of the battery cell, and is more preferably smaller than the length of from the electrode lead 71 of the battery cell to the upper surface of the terrace 73. In the case that the height difference between the first pressurizing jig 100 and the guide unit 300 is greater than or equal to the thickness of the terrace 73 of the battery cell, if the first pressurizing jig 100 pressurizes one surface of the electrode lead 71 in a state where the battery cell is mounted on the upper surface of the second pressurizing jig 200, the guide unit 300 may not come into contact with the terrace 73 of the battery cell, which may cause a fastening failure such that the electrode lead 71 is excessively inserted or is not fully inserted, and thus the effect of horizontally fastening the battery cell of the present invention cannot be exhibited.

Referring to FIGS. 6 to 8, one side of the guide support unit 310' may be connected to the first pressurizing jig control unit 400, and the other side of the guide support unit 310' may be connected to the guide unit 300'. In this case, the guide support unit 310' is movable toward one surface of the electrode lead 71 by the control of the first pressurizing jig control unit 400, and the guide unit 300 connected to the other side of the guide support unit 310' is also movable. Although not shown in the drawings, a bearing structure may be applied to the connection portion between the rotation shaft and the guide support unit 310' so that the guide support unit 310' does not rotate but only performs vertical movements even at the time of the rotational movement of the first pressurizing jig control unit 400.

Meanwhile, the charge/discharge pressurizing device according to the present invention may further include a parallel holding pin 700. The parallel holding pin 700 maintains the parallel of the first pressurizing jig 100 and/or the guide support unit 310' when the first pressurizing jig 100 and/or the guide support unit 310' are vertically moved by control of the first pressurizing jig control unit 400. At this time, the parallel holding pin 700 has a structure penetrating the first pressurizing jig 100, the guide support unit 310' and the base frame 500, respectively, and may have a form that connects the first pressurizing jig 100 with the base frame 400 or connects the first pressurizing jig 100 with the guide support unit 310' and the base frame 500. In addition, the parallel holding pin 700 may be disposed on both sides of the first pressurizing jig 100 based on one side thereof, thereby maintaining the parallel between the first pressurizing jig 100 and the guide support unit 310'.

At this time, as shown in FIG. 8, when the first pressurizing jig 100 pressurizes one surface of the electrode lead 71 in a state where the battery cell is mounted on the upper surface of the second pressurizing jig 200, the guide unit 300' preferably moves from the upper surface of the second pressurizing jig 200 at the same height as the height of the first pressurizing jig 100. In addition, the height of the guide unit 300' from the upper surface of the second pressurizing jig 200 may be equal to or greater than the height of the first pressurizing jig 100, in which case the same description as described with reference to FIG. 5 is applied, and the redundant description will be omitted.

A charge/discharge pressurizing device according to an embodiment may include a base frame 500, a support frame 600, and a charge/discharge unit (not shown).

Although the base frame 500 is illustrated as having a "n" shape in FIG. 7, the base frame 500 is not limited thereto as long as it can stably support the first pressurizing jig control unit 400 and the first pressurizing jig 100. The base frame 500 may fix the first pressurizing jig control unit 400 to face one surface of the electrode lead 71.

The support frame 600 may be formed in a plate shape facing the second pressurizing jig 200, and may not move like the first pressurizing jig 100, but may be firmly fixed to thereby play a role of supporting the second pressurizing jig 200 to face the other surface opposite to one surface of the electrode lead 71. However, the present invention is not limited thereto, and the support frame 600 may be formed of a member for moving the second pressurizing jig 200, such as the first pressurizing jig 100, and if the second pressurizing jig 200 can pressurize the other surface of the electrode lead 71 by moving the second pressurizing jig 200, the support frame 600 may be formed in another form.

In addition, the support frame 600 may be coupled to the base frame 500 or may be fixed to the ground. If the support frame 600 has a shape that can be firmly fixed, it is not limited thereto. The structure in which the base frame 500 and the support frame 600 are combined may have a hollow rectangular parallelepiped shape connected to each other so that an empty space is formed therein.

The charge/discharge unit (not shown) is electrically connected to the electrode lead 71 of the battery cell, and is provided to charge and discharge the battery cell. Specifically, the charge/discharge unit (not shown) is coupled to the first pressurizing jig 100 and the second pressurizing jig 200 and is electrically connected to the electrode of the battery cell through the first pressurizing jig 100 and the second pressurizing jig 200, to thereby receive power from the battery cell or supply power to the battery cell. Various devices that perform a function of charging or discharging a battery cell may be used as such a charge/discharge unit (not shown).

Hereinafter, a charge/discharge method of a battery cell using a charge/discharge pressurizing device according to an embodiment of the present invention will be described with reference to the drawings.

A method of charging/discharging a battery cell according to an embodiment, as shown in FIG. 10, may include steps of: mounting the battery cell on an upper surface of a second pressurizing jig 200 (S100); moving a first pressurizing jig 100 downward and allowing the guide unit 300 or 300' to contact a terrace 73 of the battery cell to thereby horizontally adjust the mounted battery cell (S200); moving the first pressurizing jig 100 to contact one surface of an electrode lead 71 of the battery cell to thereby pressurize the one surface of the electrode lead 71 (S300); and allowing a charge/discharge unit (not shown) to be connected to the electrode lead 71 in a state that the one surface of the electrode lead 71 has been pressurized, to thereby charge/discharge the battery cell (S400).

The step of mounting of the battery cell (S100) may be a step of mounting the battery cell such that one surface of the electrode lead 71 of the battery cell facing the other surface thereof faces the upper surface of the second pressurizing jig 200.

In this case, the battery cell used in the present invention may include an electrode assembly (not shown), a battery case 74, an electrode lead 71 and a lead film 72.

The electrode assembly may have a structure in which a plurality of electrodes and a plurality of separators are alternately stacked, and may have one structure selected from the group consisting of folding type, stack type, stack-fold type (SNF), and lamination-stack type (LNS), and preferably a lamination-stack structure.

The electrode assembly of the lamination-stack structure may include one or more electrodes having a laminate laminated on one or both surfaces thereof. For example, the electrode assembly of the lamination-stack structure may have a structure in which the separator is bonded to one surface of the positive electrode or the negative electrode. In addition, the separator may be bonded to both sides of the positive electrode or both sides of the negative electrode. In addition, the positive electrode, the separator and the negative electrode may be bonded to each other in a state where the separator is interposed between the positive electrode and the negative electrode.

The positive electrode is prepared by applying a mixture of a positive electrode active material, a conductive material and a binder on a positive electrode current collector, followed by drying. If necessary, a filler may be further added to the mixture.

The positive electrode active material may be a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}M_xO_2$ (herein, M=Co, Mn, Al, Cu, Fe, Mg, B or Ga, and x=0.01 to 0.3); a lithium manganese compound oxide expressed by $LiMn_{2-x}M_xO_2$ (where M=Co, Ni, Fe, Cr, Zn or Ta , x=0.01 to 0.1) or $Li_2Mn_3MO_8$ (where M=Fe, Co, Ni, Cu or Zn); $LiMn_2O_4$ in which a part of Li is substituted with an alkaline earth metal ion; disulfide compounds; $Fe_2(MoO_4)_3$, etc., but not limited thereto.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like, but the present invention is not limited to these examples.

The binder is added in an amount of 1 to 30% by weight, on the basis of the total weight of the mixture containing the positive electrode active material, as a component that assists in bonding between the active material and the conductive material and bonding to the current collector. Non-limiting examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The negative electrode may be formed by coating a negative electrode active material on a negative electrode collector and drying the negative electrode active material. Optionally, the negative electrode may further include the above-described components.

Examples of the negative electrode active material include carbon such as non-graphitized carbon and graphite carbon; metal complex oxide such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, groups 1, 2, and 3 of the periodic table, halogen; $0<x<1$; $1 \le y \le 3$; $1 \le z \le 8$); lithium alloy; silicon alloy; tin alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni-based materials.

The separator may be formed of an insulating thin film having high ion permeability and mechanical strength. The process diameter of the separator is generally between 0.01 and 10 μm, the thickness may be between 5 and 300 μm. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

Meanwhile, a polar organic electrolyte and a lithium salt-containing non-aqueous electrolyte solution containing lithium may have been injected into an electrode assembly housed inside the battery case. Non-limiting examples of the electrolyte may be a non-aqueous electrolyte, an organic solid electrolyte, an inorganic solid electrolyte, or the like.

Non-limiting examples of the non-aqueous liquid electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The battery case 74 may be formed of a laminate sheet including a resin layer and a metal layer, and may package an electrode assembly. Such a battery case may include a case body 74 and a case terrace 73.

The case body 74 may accommodate the electrode assembly, and for this purpose, the case body 74 may be provided with an accommodation space for accommodating the electrode assembly. The case terrace 73 extends from the case body 74 and may be sealed to seal the inside of the case body 74.

One or more electrode leads 71 may be provided, and each electrode leads 71 may include a positive electrode lead and a negative electrode lead. The electrode lead 71 is electrically connected to the electrode assembly and may protrude out of the battery case 74, specifically, the case terrace 73.

The lead film 72 is used to increase the sealing property between the electrode lead 71 and the battery case 74, specifically, the case terrace 73, and may be disposed between the upper surface and the lower surface of the electrode lead 71 positioned on the sealing surface of the case, respectively.

Thereafter, the first pressurizing jig 100 is moved downward to face one surface of the electrode lead 71, and the guide units 300 and 300' may be brought into contact with the terrace 73 of the battery cell to thereby perform a step S200 of horizontally adjusting the mounted battery cell. As the first pressurizing jig 100 is moved in a downward direction, the guide units 300 and 300' are also moved downward, thereby allowing the guide units 300 and 300' to contact the terrace 73 of the battery cell. At this time, as the guide units contacts the terrace 73 of the battery cell, it is possible to prevent a fastening failure that the electrode lead 71 of the battery cell is excessively inserted or is not sufficiently inserted, and the battery cell may be horizontally adjusted.

Thereafter, the first pressurizing jig 100 may be moved to contact one surface of the electrode lead 71 of the battery cell to pressurize one surface of the electrode lead 71 (S300). At this time, in a state in which one surface of the electrode lead 71 is pressurized, as the charge/discharge unit (not shown) is connected to the electrode lead 71 and charges/discharges the battery cell (S400), the charge/discharge of the battery cell may be completed. At this time, the charge/discharge unit (not shown) is coupled to the first pressurizing jig 100 and the second pressurizing jig 200 and is electrically connected to the electrode of the battery cell through the first pressurizing jig 100 and the second pressurizing jig 200, to thereby receive power from the battery cell or supply power to the battery cell.

Meanwhile, after the charge/discharge is completed in the state in which the electrode lead 71 has been pressurized as described above, the process of separating the battery cell from the charge/discharge pressurizing device is also required.

Thus, the charge/discharge method of the battery cell according to the present invention may include a process in which the charge/discharge unit (not shown) is detached from the first pressurizing jig 100 and the second pressurizing jig 200. In addition, the first pressurizing jig 100 connected to the first pressurizing jig control unit 400 of the charge/discharge pressurizing device may include a process of moving in a direction opposite to one surface of the electrode lead 71. In order to release the pressurized state of the electrode lead 71 by the first pressurizing jig 100, the first pressurizing jig 100 may move in a direction opposite to one surface of the electrode lead 71. As a result, the battery cell in which the charge/discharge has been completed may be separated from the charge/discharge pressurizing device.

Hereinafter, the present invention will be described in detail with reference to Examples, but the following Examples are merely to illustrate the present invention, and the present invention is not limited by the following Examples.

Example 1

A battery cell having an electrode lead of 22.3 mm in length was prepared. After the battery cell was mounted on the charge/discharge pressurizing device, the charge/discharge was performed. At this time, as the terrace of the battery cell contacts the guide unit, the length of the electrode lead pressurized on the first pressurizing jig was 20 mm.

Comparative Example 1

The charge/discharge was performed through the same process as in Example 1, except that the charge/discharge pressurizing device shown in FIG. 1 was used. At this time, the length of the electrode lead pressurized on the first pressurizing jig was 5 mm.

Experimental Example 1

During charge and discharge in Example 1 and Comparative Example 1, the temperatures of the upper surface, the inside, the positive electrode and the negative electrode of the battery cell were measured. In addition, impedance after charge and impedance after discharge were also measured, and the results are shown in Table 1 and FIG. 9.

TABLE 1

| | Maximum temperature (° C.) according to measured position | | | | Impedance (mΩ) | |
|---|---|---|---|---|---|---|
| | Upper surface of cell | negative electrode | Inside of cell | positive electrode | After charge | After discharge |
| Example 1 | 29.1 | 41.6 | 39.1 | 37.5 | 1.85 | 1.60 |
| Comparative Example 1 | 37.8 | 44.2 | 41.1 | 39.1 | 5.35 | 7.63 |

As can be seen in Table 1 and FIG. 9, when charging and discharging the battery cell using the charge/discharge pressurizing device according to the Example 1, the length of the electrode lead pressurized to the first pressurizing jig is 20 mm. As the battery cell is normally fastened, it can be seen that the temperature generated in the impedance and the battery cell is low after charging and discharging, compared to Comparative Example 1.

On the other hand, in the case of Comparative Example 1, as the charge/discharge proceeds in a state where the electrode lead is not sufficiently inserted, the impedance appears high after charging and discharging, which causes the decomposition reaction of active materials, electrolytes, etc. which are battery components, thereby generating heat. As such, a high heat-generating temperature is shown compared to the Example 1.

Although the above has been described with reference to a preferred embodiment of the present invention, it can be understood that those skilled in the art can make various modifications and changes to the present invention without departing from the spirit and scope of the invention as set forth in the claims below.

Therefore, the technical scope of the present invention should not be limited to the contents described in the detailed description of the specification but should be defined by the claims.

DESCRIPTION OF SYMBOLS

100: first pressurizing jig
200: second pressurizing jig
300, 300': guide unit
310, 310': guide support unit
400: first pressurizing jig control unit
500: base frame
600: support frame
700: parallel holding pin

What is claimed is:

1. A charge/discharge pressurizing device comprising:
a first pressurizing jig configured to pressurize one surface of an electrode lead of a battery cell;
a second pressurizing jig configured to pressurize an other surface of the electrode lead facing the one surface of the electrode lead;
a guide configured to be disposed to be spaced apart horizontally from done surface of the first pressurizing jig by a predetermined distance and configured to move with the first pressurizing jig; and
a first pressurizing jig controller configured to be connected to the first pressurizing jig and to move the first pressurizing jig toward the one surface of the electrode lead.

2. The charge/discharge pressurizing device of claim 1, wherein the guide is configured to contact a terrace of the battery cell when the first pressurizing jig pressurizes the one surface of the electrode lead in a state that the battery cell has been mounted on an upper surface of the second pressurizing jig.

3. The charge/discharge pressurizing device of claim 1, wherein the guide comprises a first guide and a second guide disposed at opposite sides of the one surface of the first pressurizing jig.

4. The charge/discharge pressurizing device of claim 1, wherein a distance between the first pressurizing jig and the guide is equal to or greater than a length of a lead film of the battery cell.

5. The charge/discharge pressurizing device of claim 1, further comprising a guide support configured to support the guide such that the guide is spaced apart from the one surface of the first pressurizing jig by the predetermined distance.

6. The charge/discharge pressurizing device of claim 5, wherein one side of the guide support is connected to the first pressurizing jig, and an other side of the guide support is connected to the guide.

7. The charge/discharge pressurizing device of claim 6, wherein a height each of the first pressurizing jig and the guide from an upper surface of the second pressurizing jig correspond to each other, or the height of the guide is greater than or equal to the height of the first pressurizing jig.

8. The charge/discharge pressurizing device of claim 7, wherein a height difference between the height of the first pressurizing jig and the height of the guide is smaller than a thickness of a terrace of the battery cell.

9. The charge/discharge pressurizing device of claim 5, wherein one side of the guide support is connected to the first pressurizing jig controller, and an other side of the guide support is connected to the guide, and
wherein the guide support unit is movable toward the one surface of the electrode lead by the first pressurizing jig controller.

10. The charge/discharge pressurizing device of claim 9, wherein the guide moves by a same height of the first pressurizing jig from an upper surface of the second pressurizing jig when the first pressurizing jig pressurizes the one surface of the electrode lead in a state that the battery cell has been mounted on the upper surface of the second pressurizing jig.

11. The charge/discharge pressurizing device of claim 1, further comprising parallel holding pins disposed at opposites sides of the one side surface of the first pressurizing jig.

12. The charge/discharge pressurizing device of claim 1, wherein the guide comprises:
   a first guide;
   a second guide; and
   a width adjuster configured to adjust a width between the first and second guides.

13. The charge/discharge pressurizing device of claim 1, further comprising:
   a base frame configured to fix the first pressurizing jig controller to face the one surface of the electrode lead; and
   a support frame configured to support the second pressurizing jig to face the other surface of the electrode lead.

14. The charge/discharge pressurizing device of claim 1, further comprising a charger/discharger configured to be electrically connectable to the electrode lead of the battery cell.

15. A method of charging/discharging a battery cell by using the charge/discharge pressurizing device of claim 1, the method comprising:
   mounting the battery cell on an upper surface of the second pressurizing jig;
   moving the first pressurizing jig downward to allow the guide to contact a terrace of the battery cell to thereby horizontally adjust the mounted battery cell;
   further moving the first pressurizing jig downward to contact one surface of an electrode lead of the battery cell to thereby pressurize the one surface of the electrode lead; and
   connecting a charger/discharger to the electrode lead in a state that the one surface of the electrode lead has been pressurized to thereby charge/discharge the battery cell.

* * * * *